United States Patent
Zandi et al.

(10) Patent No.: US 10,447,815 B2
(45) Date of Patent: Oct. 15, 2019

(54) PROPAGATING NETWORK CONFIGURATION POLICIES USING A PUBLISH-SUBSCRIBE MESSAGING SYSTEM

(71) Applicant: LinkedIn Corporation, Sunnyvale, CA (US)

(72) Inventors: Shafagh Zandi, San Francisco, CA (US); Russell I. White, Apex, NC (US); Zaid A. Kahn, San Francisco, CA (US); Vikas Kumar, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 338 days.

(21) Appl. No.: 15/453,271

(22) Filed: Mar. 8, 2017

(65) Prior Publication Data
US 2018/0262592 A1    Sep. 13, 2018

(51) Int. Cl.
*G06F 15/177* (2006.01)
*H04L 29/08* (2006.01)
*H04L 12/24* (2006.01)

(52) U.S. Cl.
CPC .......... *H04L 67/34* (2013.01); *H04L 41/0893* (2013.01); *H04L 67/26* (2013.01); *H04L 41/08* (2013.01); *H04L 41/0806* (2013.01)

(58) Field of Classification Search
CPC ..... H04L 67/34; H04L 45/00; H04L 41/0893; H04L 67/26; H04L 41/0806; H04L 41/08
See application file for complete search history.

(56) References Cited

U.S. PATENT DOCUMENTS

| | | |
|---|---|---|
| 5,721,810 A | 2/1998 | Hahn et al. |
| 6,507,562 B1 | 1/2003 | Kadansky et al. |
| 7,283,463 B2 | 10/2007 | Miller et al. |
| 7,618,808 B1 | 11/2009 | Papp |
| 7,860,024 B1 | 12/2010 | Greenberg et al. |
| 8,065,411 B2 | 11/2011 | Spiess et al. |
| 9,286,047 B1 | 3/2016 | Avramov et al. |
| 2002/0070966 A1 | 6/2002 | Austin |
| 2002/0101869 A1 | 8/2002 | Garcia-luna-aceves et al. |
| 2003/0216143 A1 | 11/2003 | Roese et al. |

(Continued)

FOREIGN PATENT DOCUMENTS

| | | |
|---|---|---|
| EP | 1881460 A1 | 1/2008 |

OTHER PUBLICATIONS

"Non Final Office Action Issued in U.S. Appl. No. 15/453,438", dated Oct. 19, 2018, 26 Pages.

(Continued)

*Primary Examiner* — John B Walsh
(74) *Attorney, Agent, or Firm* — Park, Vaughan, Fleming & Dowler LLP; Chia-Hsin Suen

(57) ABSTRACT

The disclosed embodiments provide a system for propagating network configuration policies using a publish-subscribe messaging system. During operation, the system receives, through the publish-subscribe messaging system, one or more messages containing a first representation of a configuration policy from a policy server. Next, the system uses a data model to convert the first representation into a second representation of the configuration policy. The system then uses the second representation to apply the configuration policy during processing of network traffic.

17 Claims, 11 Drawing Sheets

(56) References Cited

U.S. PATENT DOCUMENTS

| | | |
|---|---|---|
| 2003/0235157 A1 | 12/2003 | Boivie et al. |
| 2007/0008949 A1 | 1/2007 | Balandin |
| 2007/0150441 A1 | 6/2007 | Morris |
| 2007/0274204 A1 | 11/2007 | Varada et al. |
| 2008/0279103 A1 | 11/2008 | Yong et al. |
| 2009/0116413 A1 | 5/2009 | George |
| 2009/0265327 A1* | 10/2009 | Zou .................. H04L 45/00 |
| 2010/0241903 A1 | 9/2010 | Goldszmidt et al. |
| 2010/0272110 A1 | 10/2010 | Allan et al. |
| 2012/0134361 A1 | 5/2012 | Wong et al. |
| 2014/0143346 A1 | 5/2014 | Mahmud et al. |
| 2015/0200806 A1 | 7/2015 | Donley et al. |
| 2016/0112252 A1 | 4/2016 | Notari |
| 2016/0366061 A1* | 12/2016 | Renzullo ............. H04L 67/1002 |
| 2017/0142226 A1 | 5/2017 | De foy et al. |
| 2017/0230410 A1 | 8/2017 | Hassanzadeh et al. |
| 2017/0272469 A1 | 9/2017 | Kraemer et al. |
| 2018/0176139 A1* | 6/2018 | Mortensen ............. H04L 47/32 |
| 2018/0262392 A1 | 9/2018 | White |
| 2018/0262454 A1 | 9/2018 | Zandi et al. |
| 2018/0262585 A1 | 9/2018 | Zandi et al. |

OTHER PUBLICATIONS

"Final Office Action Issued in U.S. Appl. No. 15/453,438", dated Feb. 4, 2019, 26 Pages.

Lammle, et al., "The CCNP Routing Study Guide", In Publication of MacGraw-Hill, Nov. 27, 2000, 2 Pages.

"Non Final Office Action Issued in U.S. Appl. No. 15/453,407", dated Dec. 2, 2018, 8 Pages.

"Non Final Office Action Issued in U.S. Appl. No. 15/453,245", dated Apr. 18, 2019, 29 Pages.

"Final Office Action Issued in U.S. Appl. No. 15/453,245", dated Aug. 21, 2019, 25 Pages.

\* cited by examiner

PROPAGATING NETWORK CONFIGURATION POLICIES USING A PUBLISH-SUBSCRIBE MESSAGING SYSTEM

RELATED APPLICATIONS

The subject matter of this application is related to the subject matter in a non-provisional application by inventors Shafagh Zandi, Russell I. White, Zaid A. Kahn and Saikrishna Mangala Kotha and filed on the same day as the instant application, entitled "Sub-Second Network Telemetry Data Using a Publish-Subscribe Messaging System," having Ser. No. 15/453,245, which is incorporated herein by reference.

The subject matter of this application is also related to the subject matter in a co-pending non-provisional application by inventors Shafagh Zandi, Russell I. White and Ignacio Solis and filed on the same day as the instant application, entitled "Network Routing Using a Publish-Subscribe Messaging System," having Ser. No. 15/453,407.

BACKGROUND

Field

The disclosed embodiments relate to configuration of nodes in a network. More specifically, the disclosed embodiments relate to techniques for propagating network configuration policies using a publish-subscribe messaging system.

Related Art

Multiple protocols are typically used to perform routing, management, telemetry, processing, and other tasks in networks. For example, network management protocols such as Network Configuration Protocol (NETCONF), Simple Network Management Protocol (SNMP), and/or sampled flow (sFlow) may be used to configure and monitor network devices. Similarly, routing protocols such as Open Shortest Path First (OSPF), Border Gateway Protocol (BGP), and/or Intermediate System to Intermediate System (IS-IS) may be used to construct network topologies of the networks and corresponding routing tables containing paths to destinations in the networks.

Because each protocol is standardized to meet a set of requirements or perform a specific set of tasks, designing a network to support and use the protocol may be associated with a significant amount of overhead and/or security risk. For example, the collection and transmission of network telemetry data from a network device may require the use of multiple processing layers on the network device and adherence to fixed message formats and contents. In a second example, network configuration is commonly performed by sending configuration policies to individual network devices, even when the same configuration policy is applied to multiple devices. In a third example, a conventional routing protocol may iterate through multiple finite states and/or flood a network multiple times before convergence is reached. Consequently, management, configuration, routing, and/or processing in computer networks may be improved by reducing dependence on conventional network protocols and network device features.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
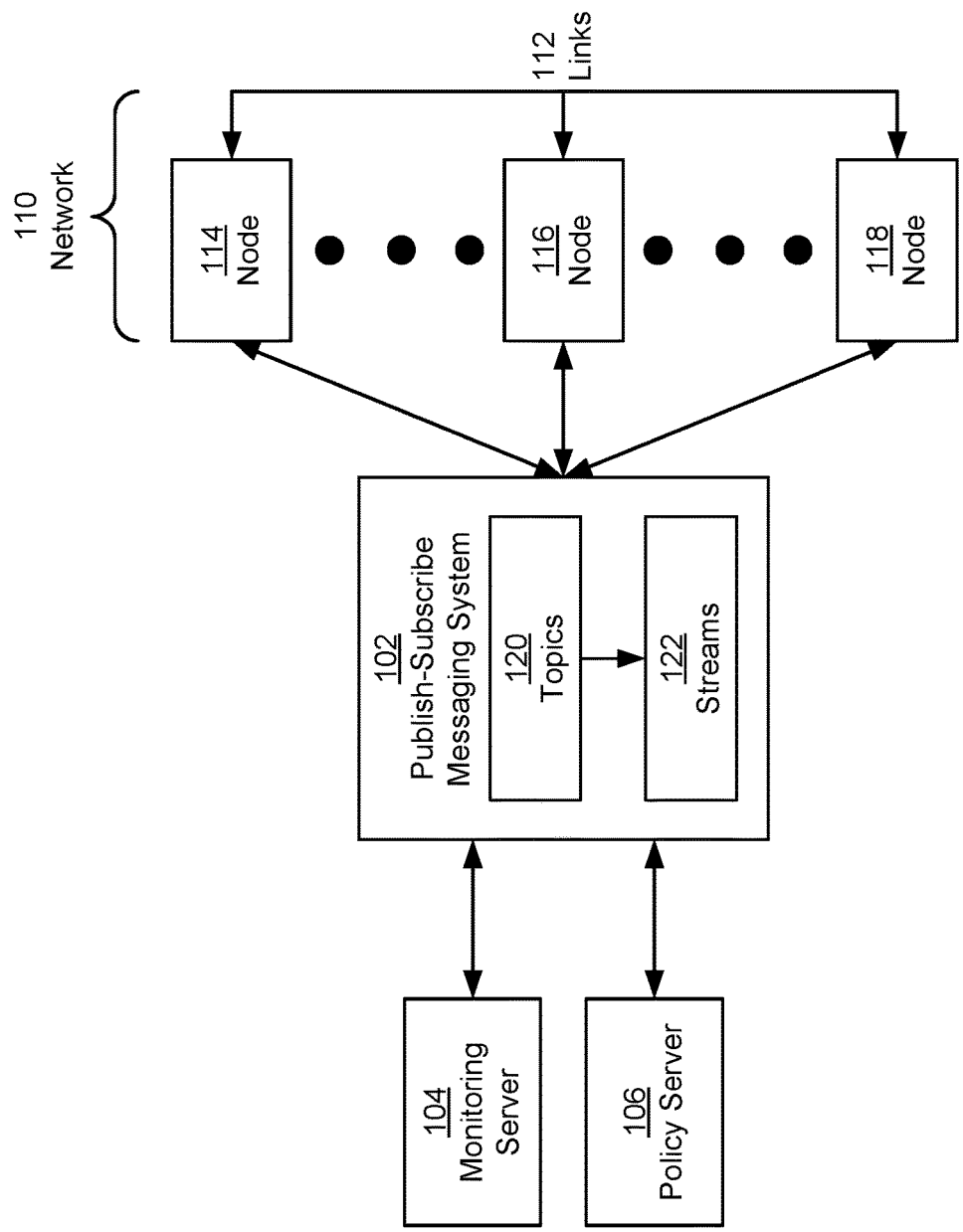
FIG. 1 shows a schematic of a system in accordance with the disclosed embodiments.

The disclosed embodiments provide a method, apparatus, and system for managing use of a computer network. More specifically, the disclosed embodiments provide a method, apparatus, and system for using a publish-subscribe messaging system to perform network telemetry, configuration, and routing in a computer network. As shown in FIG. 1, a network 110 may include a set of nodes 114-118 connected by a set of links 112. For example, nodes 114-118 may include switches, routers, hosts, and/or other network elements in a local area network (LAN), wide area network (WAN), personal area network (PAN), virtual private network, intranet, mobile phone network (e.g., a cellular network), WiFi network, Bluetooth network, universal serial bus (USB) network, Ethernet network, switch fabric, and/or other type of packet-switched network. Within the network, a given pair of nodes may be connected via one or more physical and/or virtual links.

During use of network 110, nodes 114-118 may be used to collect network telemetry data, establish routes and best paths to one another, process and forward network traffic, apply network configuration policies associated with the network, and/or perform other tasks within the control, data, and management planes. Moreover, the nodes may use multiple protocols to perform the tasks and/or communicate with one another and/or a network management system (NMS) for administering the network. For example, network management protocols such as Network Configuration Protocol (NETCONF), Simple Network Management Protocol (SNMP), and/or sampled flow (sFlow) may be used to configure and monitor the nodes. In another example, routing protocols such as Open Shortest Path First (OSPF), Border Gateway Protocol (BGP), and/or Intermediate System to Intermediate System (IS-IS) may be used to construct a network topology and corresponding routing tables containing paths to destinations in the network.

On the other hand, the use of multiple disparate protocols to administer the control, data, and management planes in the nodes may interfere with the customizability, scalability, efficiency, and/or security of network 110. For example, each protocol may include a different standard, message format, sequence of steps, and/or other set of required attributes or properties, even if many of the attributes or properties are not used by the nodes or network. At the same time, the protocol may be associated with a set of vulnerabilities and/or limitations that reduce the efficiency, customizability, and/or security of the network.

In one or more embodiments, the system of FIG. 1 includes functionality to reduce overhead associated with performing configuration, routing, network telemetry, and/or other administration or execution of nodes 114-118 in network 110. More specifically, a publish-subscribe messaging system 102 may be used by a monitoring server 104, a policy server 106, and/or the nodes to communicate information that is used to configure or operate the control, data, and/or management planes of the nodes.

Publish-subscribe messaging system 102 may allow streams 122 of messages to be generated and identified by a number of topics 120, thereby enabling producers of the messages to publish information to the topics and consumers of the information to subscribe to the topics. For example, publish-subscribe messaging system 102 may be implemented using a set of physical and/or virtual machines that operate as servers or brokers within the Apache Kafka (Kafka™ is a registered trademark of the Apache Software Foundation) platform. In turn, the monitoring server, policy server, and nodes may use an application-programming interface (API) with the platform to create topics, subscribe to the topics, and publish messages to the topics. By decoupling transmission of the messages from the producers from receipt of the messages by the consumers, the publish-subscribe messaging system may allow topics, streams, producers, and/or consumers to be dynamically added, modified, and removed without interfering with the transmission and receipt of messages using other topics, streams, producers, and/or consumers.

Nodes 114-118 may include hardware and/or software components that are customized to enable use of publish-subscribe messaging system 102 in lieu of conventional network protocols. For example, the nodes may include switches with programmable hardware components that are capable of running custom network operating systems and application-layer components. The switches may thus be configured to execute tools or services that are available outside of the feature set of conventional switches, such as Kafka agents that allow the nodes to communicate with one another, monitoring server 104, and/or policy server 106 through the publish-subscribe messaging system.

Monitoring server 104 may use publish-subscribe messaging system 102 to collect and analyze network telemetry data collected by nodes 114-118. As described in further detail below with respect to FIG. 2, the monitoring server may subscribe to one or more topics 120 associated with network telemetry data in the publish-subscribe messaging system, and the nodes may publish streams 122 of messages containing the network telemetry data to the topics. In turn, the monitoring server may apply a statistical model to the network telemetry data, correlate events in the network telemetry data, aggregate the network telemetry data into statistics and/or other values, filter or group the network telemetry data, update a log with the network telemetry data, and/or generate an alert or visualization using the network telemetry data.

Policy server 106 may use publish-subscribe messaging system 102 to perform centralized configuration of nodes 114-118. As described in further detail below with respect to FIG. 3, the policy server may publish configuration policies for network 110 to one or more streams 122 of messages in the publish-subscribe messaging system, and the nodes may receive the configuration policies by subscribing to topics 120 to which the streams are published. The nodes may then apply the configuration policies by converting serialized forms of the configuration policies in the messages into formats that can be used by the corresponding processing layers (e.g., network stack layers) in the nodes.

Nodes 114-118 may additionally use publish-subscribe messaging system 102 to exchange reachability information that allows the nodes to construct a topology of network 110 and routing tables containing paths to destinations in the network. As described in further detail below with respect to FIG. 4, a node that detects a change in reachability in the network may publish the change in a message to the publish-subscribe messaging system. Other nodes in the network may subsequently receive the change through subscriptions to the topic to which the message was published and use the change to update their routing databases.

Those skilled in the art will appreciate that the system of FIG. 1 may be implemented in a variety of ways. First, nodes 114-118, monitoring server 104, and policy server 106 may be provided by one or more switches, routers, computer systems, electronic devices, servers, virtual machines, network elements, grids, clusters, and/or cloud computing systems. Similarly, communication between publish-subscribe messaging system 102 and the nodes, monitoring server, and policy server may be enabled using one or more hardware and/or software components and/or layers.

Second, one or more portions of publish-subscribe messaging system 102 may be implemented on other components of the system. For example, one or more nodes 114-118, monitoring server 104, and/or policy server 106 may execute brokers for receiving messages published to the publish-subscribe messaging system, storing the messages, and allowing agents of the publish-subscribe messaging system executing on other components of the system to retrieve the stored messages.

Figure 2:
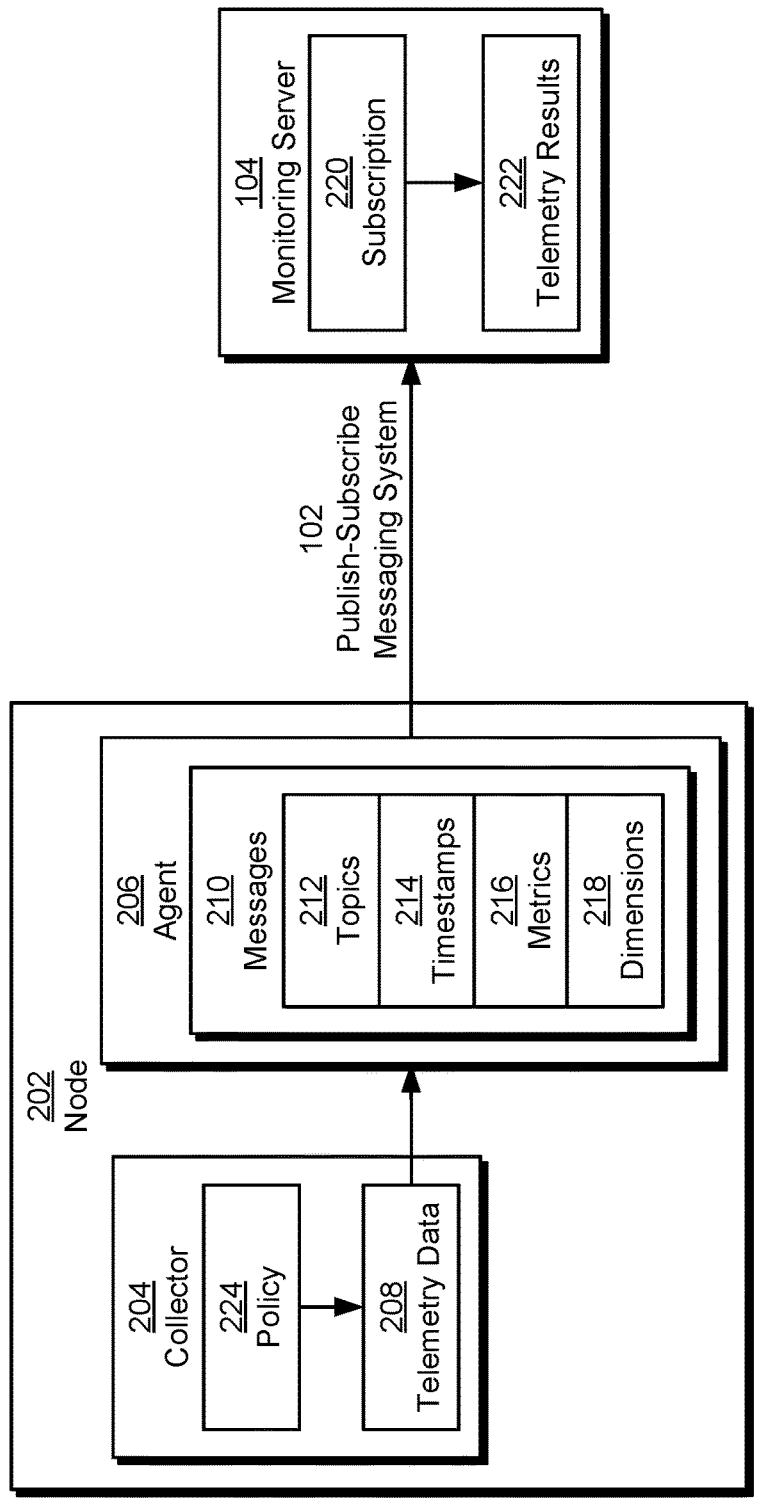
FIG. 2 shows a system for performing sub-second network telemetry using a publish-subscribe messaging system in accordance with the disclosed embodiments.

FIG. 2 shows a system for performing sub-second network telemetry using publish-subscribe messaging system 102 in accordance with the disclosed embodiments. As shown in FIG. 2, a node 202 in a network (e.g., network 110 of FIG. 1) may include a hardware and/or software collector 204 that collects telemetry data 208 and an agent 206 that transmits the telemetry data in a stream of messages 210 through the publish-subscribe messaging system to monitoring server 104.

Telemetry data 208 may be used to monitor the execution and/or state of node 202. For example, the telemetry data may include a bandwidth utilization, error rate, interface, packet count, fan speed, temperature, latency, and/or another performance metric associated with the node. The telemetry data may be captured by sensors, other hardware components, an operating system, and/or applications in node 202 and aggregated by collector 204.

In addition, telemetry data 208 may be collected, aggregated and/or otherwise generated on node 202 based on a policy 224. The policy may be transmitted to publish-subscribe messaging system 102 by a policy server (e.g., policy server 106 of FIG. 1) and received by node 202 through a subscription to the corresponding topic in the publish-subscribe messaging system, as described in further detail below with respect to FIG. 3. The policy may specify the frequency, topic, and/or content of messages transmitted by the node to the publish-subscribe messaging system. For example, the policy may identify fields (e.g., metrics, dimensions, etc.) of telemetry data to be included in the messages, the granularity associated with the included telemetry data, topics to which the messages are to be published, and/or other attributes associated with telemetry data to be transmitted by the node to the publish-subscribe messaging system. In turn, the node may configure the generation of the telemetry data and/or formatting of the telemetry data in messages 210 to the publish-subscribe messaging system in a way that conforms to the policy.

After telemetry data 208 is obtained by collector 204, agent 206 may generate a number of messages 210 assigned to topics 212 associated with network telemetry in publish-subscribe messaging system 102. The messages may include timestamps 214, metrics 216, and dimensions 218 representing the telemetry data. For example, the agent may generate a message with a topic name of "interface-telemetry" and a message body of "{"timestamp": 1234000.0. "name": "interface-speed", "value": 10000, "dimensions": {"hostname": "sxp-csw4.corp.test", "interface": "0/1"}." In the message body, network telemetry data with a timestamp of "1234000.0," a metric with a name of "interface-speed" and a value of "10000," and dimensions with names of "hostname" and "interface" and respective values of "sxp-csw4.corp.test" and "0/1" are specified.

Agent 206 may publish messages 210 to publish-subscribe messaging system 102, and monitoring server 104 may use a subscription 220 to topics 212 to receive the messages. For example, the monitoring server may receive messages 210 by subscribing to topics associated with various types of telemetry data 208 collected by node 202 and/or other nodes in the network. Alternatively, the monitoring server may execute a broker (e.g., Kafka broker) in the publish-subscribe messaging system that directly receives and stores messages published by node 202 and/or other nodes in the network to the publish-subscribe messaging system. In turn, an agent and/or other component in the monitoring server may receive the messages from the broker for subsequent use.

After receiving messages 210 through publish-subscribe messaging system 102 (e.g., using an agent that interfaces with the publish-subscribe messaging system), monitoring server 104 may analyze the telemetry data in the messages and generate and/or output telemetry results 222 associated with the analysis. For example, the monitoring server may apply a statistical model to the telemetry data and/or correlate events in the telemetry data to identify faults, failures, anomalies, trends, and/or other states in the node. The monitoring server may also generate alerts and/or notifications based on statistical model output, the correlated events, and/or other results or conclusions drawn from the analysis. In a second example, the monitoring server may update a log and/or storage mechanism with the telemetry data for subsequent retrieval, analysis, and/or use by other components or entities. In a third example, the monitoring server may display a visualization (e.g., chart, graph, animation, etc.) containing the telemetry data and/or associated analysis. In a fourth example, the monitoring server may aggregate or group the telemetry data along time intervals, dimensions, and/or other attributes.

By using publish-subscribe messaging system 102 to collect network telemetry data 208 from node 202 and/or other nodes in the network, the system of FIG. 2 may allow network telemetry to be performed at varying granularities and/or with different sets or types of telemetry data. The publish-subscribe messaging system may also allow the collection of telemetry data to be customized to the roles, operating conditions, and/or states of the nodes. Consequently, the system of FIG. 2 may be more flexible, configurable, efficient, fine-grained, and/or streamlined than conventional protocols for performing network telemetry.

Figure 3:
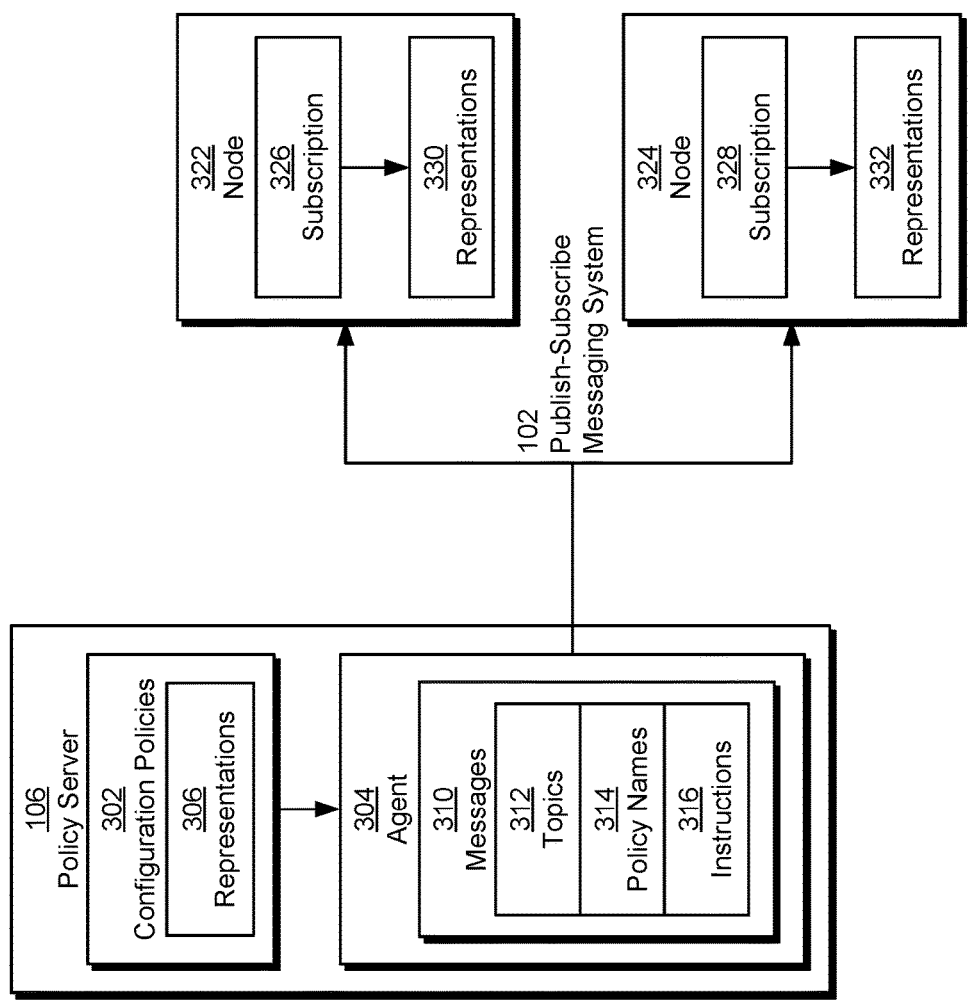
FIG. 3 shows a system for propagating network configuration policies using a publish-subscribe messaging system in accordance with the disclosed embodiments.

FIG. 3 shows a system for propagating network configuration policies using publish-subscribe messaging system 102 in accordance with the disclosed embodiments. In the system of FIG. 3, policy server 106 may use publish-subscribe messaging system 102 to propagate configuration policies 302 to nodes 322-324 in a network, such as network 110 of FIG. 1.

Configuration policies 302 may be used to configure and/or manage the operation of nodes 322-324. For example, the configuration policies may be applied to the management planes of switches, routers, hosts, and/or other network elements in the network. As a result, the configuration policies may include access control lists, routing policies, hardware configurations, prefix lists, network telemetry configurations, and/or messages to be transmitted over the network. Representations 306 of configuration policies 302 may be provided to policy server 106 by a network administrator for inclusion in messages 310 to publish-subscribe messaging system 102. For example, representations 306 may include serialized forms of configuration policies 302 that can be transmitted to the nodes. Alternatively, the policy server may use one or more serialization formats to generate representations 306 from objects and/or data structures specifying configuration policies 302.

An agent 304 in policy server 106 may assign messages 310 to topics 312 associated with the corresponding configuration policies 302 and include serialized representations 306 of the configuration policies in the messages. As shown in FIG. 3, the messages may include policy names 314 and instructions 316 from the serialized representations. The policy names may identify the corresponding configuration policies, and the instructions may include rules, conditions, parameters, and/or values used to define and/or enforce the configuration policies.

Agent 304 may publish messages 310 to publish-subscribe messaging system 102, and nodes 322-324 may use subscriptions 326-328 to topics 312 to receive the messages. For example, each node may subscribe to one or more topics associated with the role of the node, the node's position in the network's topology, and/or the node's state or operating conditions, as determined by telemetry data collected from the node and/or other attributes of the node. By generating subscriptions 326-328 to the appropriate topics, nodes 322-324 may automatically receive configuration policies 302 from policy server 106 through the publish-subscribe messaging system instead of requiring an administrator to manually push the configuration policies to individual nodes, even when the same configuration policy is used with multiple nodes in the network.

After a configuration policy is received in a message through a subscription (e.g., subscriptions 326-328) to the corresponding topic (e.g., topics 312), a node (e.g., nodes 322-324) may use a data model to convert a serialized representation (e.g., representations 306) of the configuration policy in the message into a different representation (e.g., representations 330-332) that can be used by a processing layer (e.g., network stack layer) in the node to which the configuration policy pertains. The node may then provide the representation to the processing layer for application of the configuration policy by the processing layer.

For example, a serialized representation of a routing policy may be generated using the following:

```
RoutingPolicy(
    name = 'test',
    condition = RoutingPolicyCondition(
        field_name = 'med',
        op = RoutingPolicyCondition.EQ,
        value = 100
    ),
    policy = [
        RoutingPolicyLine(
            field = 'local-preference',
            value = 100
        ) ]
).SerializeToString( )
```

The above serialized representation includes a policy name of "test" and a condition with a field name of "med," an operator of "RoutingPolicyCondition.EQ," and a value of "100." The serialized representation also includes a policy instruction with a field named "local-preference" and a value of "100."

The serialized representation may be received by a node in a message from publish-subscribe messaging system 102 and converted into the following new representation:

```
route-policy test
    if med eq 100 then
        set local-preference 100
    endif
end-policy
```

The node may provide the new representation to a BGP component in the node, and the component may use the new representation to apply the routing policy. For example, the routing component may use the policy to compare a BGP multi-exit discriminator (MED) attribute for a route from a neighbor to the value of "100." When the attribute matches the value, the component may set a local preference attribute for the neighbor in a BGP table to the same value of 100.

Figure 4:
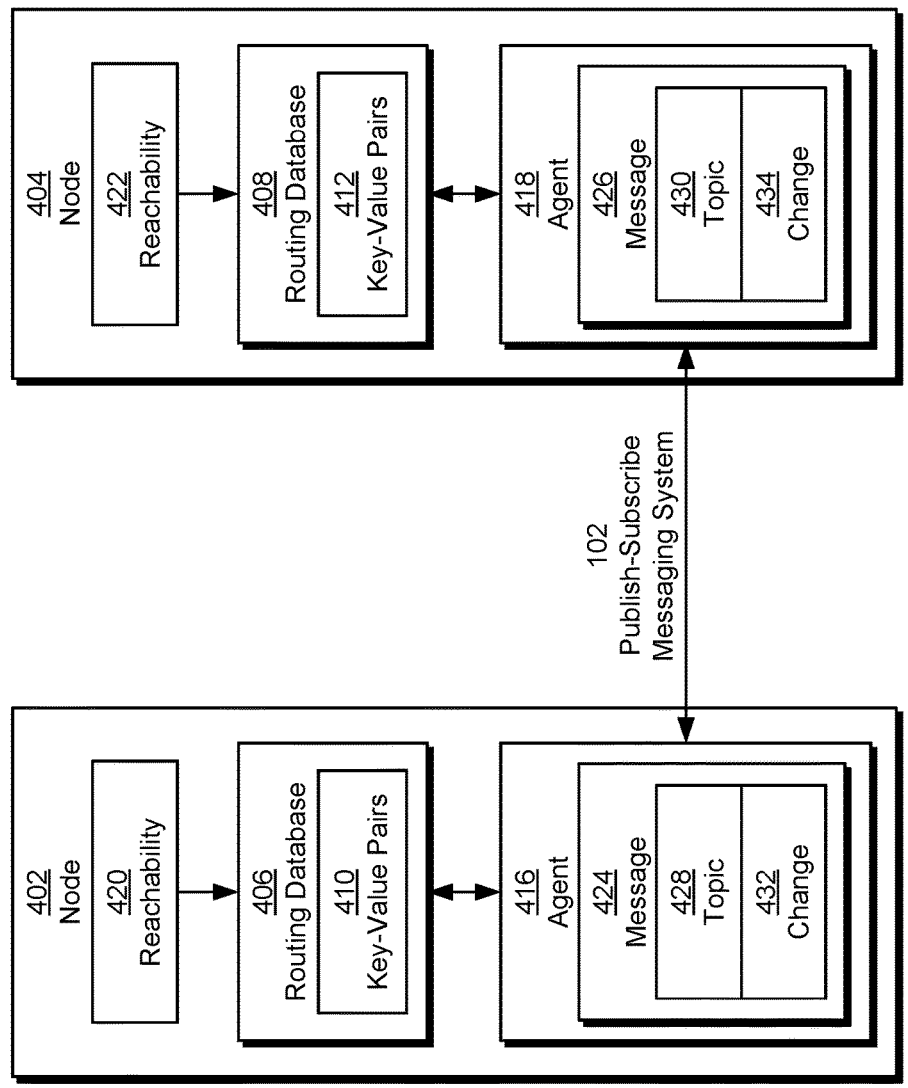
FIG. 4 shows a system for performing network routing using a publish-subscribe messaging system in accordance with the disclosed embodiments.

FIG. 4 shows a system for performing network routing using publish-subscribe messaging system 102 in accordance with the disclosed embodiments. In the system of FIG. 4, multiple nodes 402-404 in a network (e.g., network 110 of FIG. 1) exchange reachabilities 420-422 within the network and update routing databases 406-408 using the reachabilities by publishing and consuming messages 424-426 through publish-subscribe messaging system 102.

Reachabilities 420-422 may include reachable destinations, routes, link states, filters, quality of service (QoS) policies, segment routing instructions, and/or other information used to perform routing of network traffic by nodes 402-404. In other words, the reachabilities may be used to configure the control plane of each node. After a change (e.g., changes 432-434) in reachability is detected by a node, the node may update one or more key-value pairs (e.g., key-value pairs 410-412) in a local routing database (e.g., routing databases 406-408) with the change. For example, the node may add, change, or remove mappings of destination filters to addresses, source filters to addresses, best-effort queues to addresses or flows, reachable destinations to addresses, next hops to addresses, and/or other types of routing information in the routing database to reflect the change. The routing database may include a routing table, forwarding table, link state database, and/or other repository of routing information at the node.

The node may also communicate the change to other nodes in the network using publish-subscribe messaging system 102. For example, node 402 may include a change 432 in reachability 420 detected by node 402 in a message 424 and assign message 424 to a topic 428 associated with routing information in the network. Node 402 may publish message 424 to the publish-subscribe messaging system, and node 404 and/or other nodes in the network may receive message 424 through subscriptions to topic 428 with the publish-subscribe messaging system. Similarly, node 404 may include a change 434 in reachability 422 detected by node 404 in a separate message 426 and assign message 426 to a topic 430, which may be the same as topic 428 or different from topic 428. Node 404 may publish message 426 to the publish-subscribe messaging system, and node 402 and/or other nodes in the network may receive the message through subscriptions to topic 430 with the publish-subscribe messaging system. Thus, topics 428-430 may be related to routing in the network and/or types of routing information exchanged by nodes in the network.

After a node updates its routing database with a change in reachability received through publish-subscribe messaging system 102, the node may verify the consistency of the updated routing database with other routing databases of other nodes in the network. For example, the node may use the publish-subscribe messaging system and/or another communication mechanism to receive a hash, checksum, version, copy of the change, and/or other value representing the change in the routing database from the node in which the change was detected and/or from other nodes in the network. The node may compare the received value with a corresponding value calculated from its local routing database and compare the two values. The node may then verify the consistency of the routing database if the two values match, and reject the consistency of the routing database if the two values do not match. If the routing database is not consistent with other routing databases, the node may re-request messages containing reachability information from the publish-subscribe messaging system and use the content of the messages to identify the inconsistency and perform another update of the routing database in a way that is consistent with the other routing databases.

If the consistency of the updated routing database is confirmed, the node may use the updated routing database to route and/or otherwise process network traffic received at the node. For example, the node may use source and/or destination filters received through publish-subscribe messaging system 102 to filter or drop packets associated with the corresponding source and/or destination addresses. In another example, the node may apply a segment routing instruction received through the publish-subscribe messaging system to packets received at the node. In a third example, the node may use a QoS policy received through the publish-subscribe messaging system to classify packets into different QoS classes and place the packets into queues associated with the QoS classes. In a fourth example, the node may use updated link state information received from other nodes through the publish-subscribe messaging system to recalculate paths in one or more routing tables and use the recalculated paths to route network traffic. Consequently, the system of FIG. 4 may reduce overhead and/or dependence on conventional routing protocols and facilitate integration of the control plane with the publish-subscribe messaging system and/or other services in the network.

Figure 5:
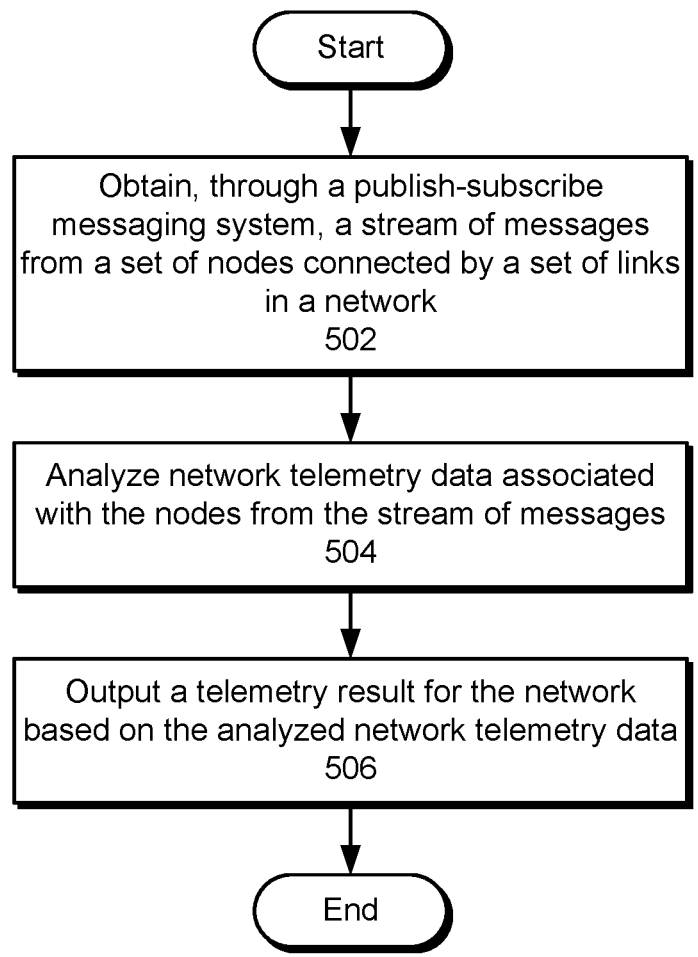
FIG. 5 shows a flowchart illustrating a process of performing network telemetry using a publish-subscribe messaging system in accordance with the disclosed embodiments.

FIG. 5 shows a flowchart illustrating a process of performing network telemetry using a publish-subscribe messaging system in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the technique.

Initially, a stream of messages from a set of nodes connected by a set of links in a network is obtained through a publish-subscribe messaging system (operation 502). The messages may be received by subscribing to one or more topics associated with network telemetry data in the publish-subscribe messaging system. Each message may be published by one of the nodes.

Next, network telemetry data associated with the nodes is extracted from the stream of messages and analyzed (operation 504). For example, a statistical model may be applied to the network telemetry data, or events in the network telemetry data may be correlated, to identify faults, failures, anomalies, and/or other states in the nodes. In a second example, the network telemetry data may be aggregated into statistics and/or other values along time intervals and/or other dimensions associated with the network telemetry data. In a third example, the network telemetry data may be grouped and/or filtered by the time intervals and/or dimensions.

Finally, a telemetry result for the network is outputted based on the analyzed network telemetry data (operation 506). For example, the network telemetry data may be added to a log and/or used to generate a visualization of the state of the network and/or changes to the state over time. In another example, an alert and/or notification may be generated based on states, trends, statistics, and/or attributes obtained from analyzing the network telemetry data.

Figure 6:
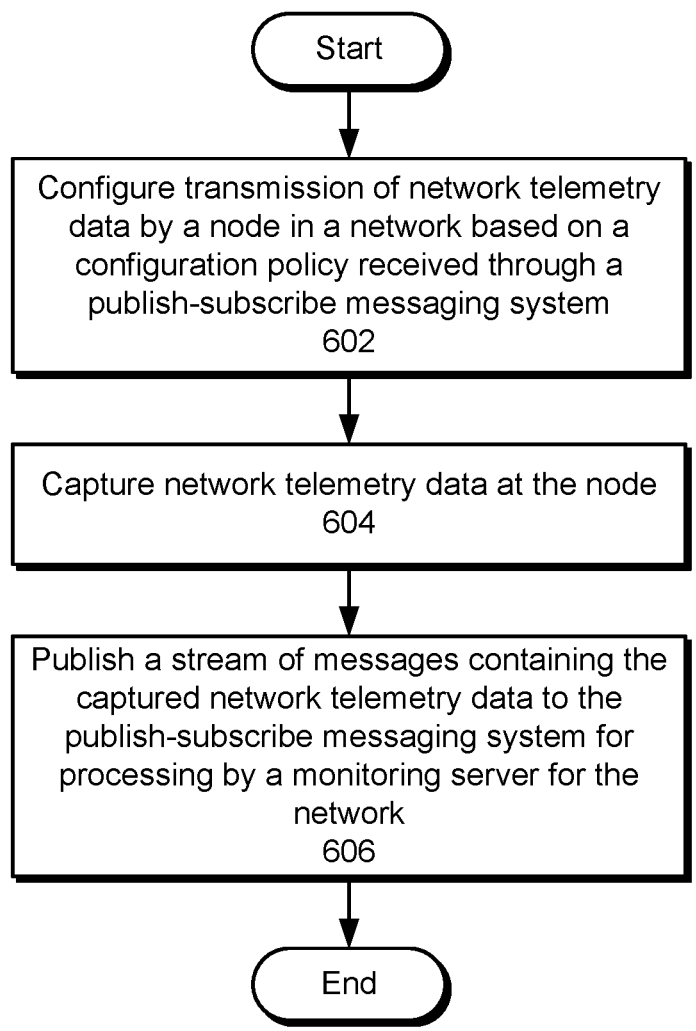
FIG. 6 shows a flowchart illustrating a process of transmitting network telemetry data from a node in a network in accordance with the disclosed embodiments.

FIG. 6 shows a flowchart illustrating a process of transmitting network telemetry data from a node in a network in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the technique.

First, transmission of the network telemetry data by the node is configured based on a configuration policy received through a publish-subscribe messaging system (operation 602). For example, the configuration policy may be published to the publish-subscribe messaging system by a policy server, received by the node via the publish-subscribe messaging system, and converted into a form that can be used by a corresponding processing layer in the node, as discussed in further detail below with respect to FIGS. 7-8.

The configuration policy may specify the frequency, topic, and/or content of messages transmitted by the node to the publish-subscribe messaging system. For example, the configuration policy may identify fields (e.g., timestamps, metrics, dimensions, etc.) of telemetry data to be included in the messages, the granularity (e.g., sub-second, second, every five seconds, etc.) of the included telemetry data, topics to which the messages are to be published, and/or other attributes associated with telemetry data to be transmitted by the node to the publish-subscribe messaging system.

Next, network telemetry data is captured at the node (operation 604). The network telemetry data may include a bandwidth utilization, error rate, interface, packet count, fan speed, temperature, latency, and/or another performance metric associated with the node. A stream of messages containing the captured network telemetry data is then published to the publish-subscribe messaging system for processing by a monitoring server for the network (operation 606). For example, the network telemetry data may be specified using one or more timestamps, metrics, and/or dimensions in the messages, and the message may be published to one or more topics associated with network telemetry data in the publish-subscribe messaging system. The monitoring server may then receive the messages through subscriptions to the topic(s), analyze the network telemetry data, and output telemetry results based on the analyzed network telemetry data, as discussed above.

Figure 7:
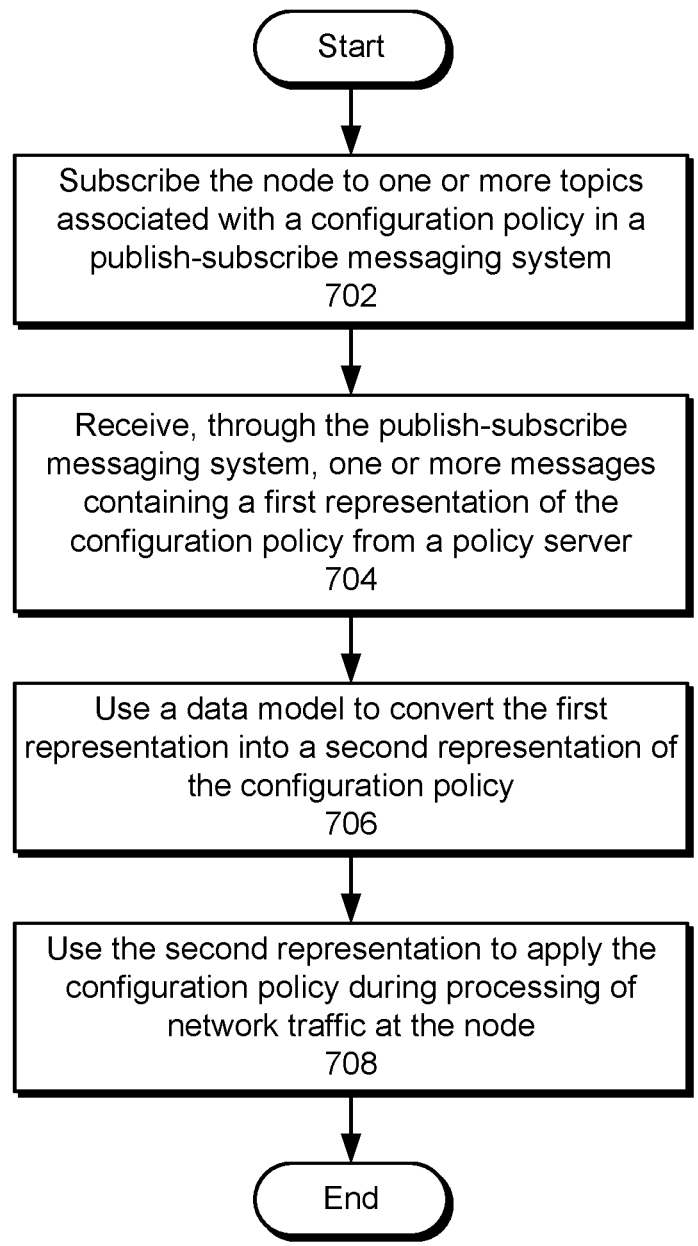
FIG. 7 shows a flowchart illustrating a process of applying a configuration policy at a node in a network in accordance with the disclosed embodiments.

FIG. 7 shows a flowchart illustrating a process of applying a configuration policy at a node in a network in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the technique.

Initially, the node is subscribed to one or more topics associated with the configuration policy in a publish-subscribe messaging system (operation 702). For example, the node may be subscribed to topics associated with the node's position in a topology (e.g., hierarchy) of the network, the node's role (e.g., server, leaf switch, spine switch, core switch, router, etc.) in the network, and/or the node's current state, as determined by the node's operation and/or by analyzing network telemetry data captured by the node. The topics may additionally be associated with different types of configuration policies, such as access control lists, routing policies, hardware configurations, prefix lists, network telemetry configurations (e.g., for collecting and transmitting network telemetry data at the node), and messages to be transmitted over the network.

Next, one or more messages containing a first representation of the configuration policy from a policy server are received through the publish-subscribe messaging system (operation 704). For example, the message(s) may be pushed to the node by the publish-subscribe messaging system upon receiving the message(s) through subscriptions to the messages' topics by the node.

A data model is then used to convert the first representation into a second representation of the configuration policy (operation 706). For example, the first representation may be transmitted in the message(s) using a serialization format. In turn, a schema associated with the serialization format and/or a processing layer (e.g., network stack layer) of the node that is associated with the configuration policy may be used to convert the first representation into a second representation with a format that can be used by the processing layer.

Finally, the second representation is used to apply the configuration policy during processing of network traffic at the node (operation 708). For example, the second representation may be passed to the corresponding processing layer in the node, and the processing layer may apply rules, conditions, parameters, values, and/or other types of instructions in the configuration policy to the network traffic.

Figure 8:
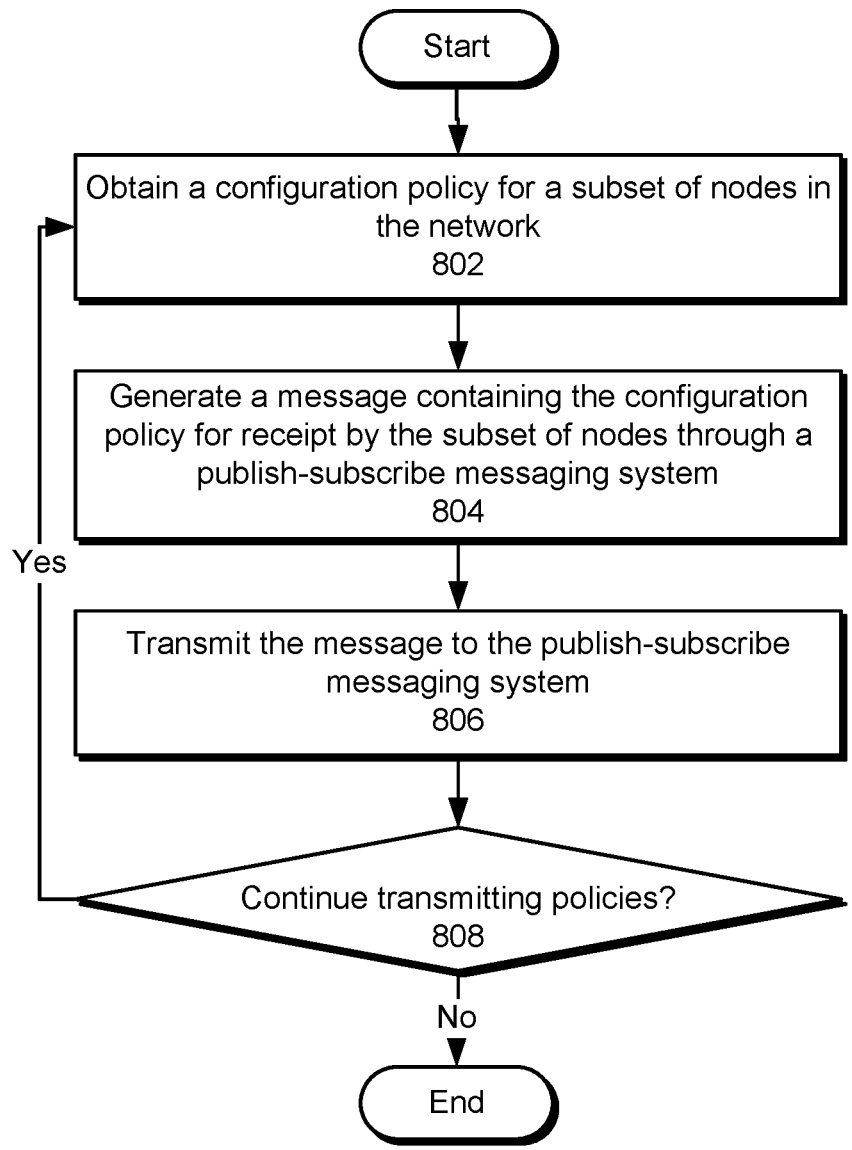
FIG. 8 shows a flowchart illustrating a process of executing a policy server for a network in accordance with the disclosed embodiments.

FIG. 8 shows a flowchart illustrating a process of executing a policy server for a network in accordance with the disclosed embodiments. In one or more embodiments, one or more of the steps may be omitted, repeated, and/or performed in a different order. Accordingly, the specific arrangement of steps shown in FIG. 8 should not be construed as limiting the scope of the technique.

First, a configuration policy for a subset of nodes in the network is obtained (operation 802) by the policy server. For example, the configuration policy may be inputted into or transmitted to the policy server by a network administrator. The configuration policy may include an access control list, routing policy, hardware configuration, prefix list, network telemetry configuration, and/or message to be transmitted over the network.

Next, a message containing the configuration policy is generated for receipt by the subset of nodes through a publish-subscribe messaging system (operation 804). For example, the message may be assigned to a topic that can be used to target the subset of nodes, such as a topic related to a common role, state, and/or position in the network topology shared by the nodes. The topic may optionally be associated with a type of configuration policy to prevent nodes that lack features and/or functionality associated with certain types of configuration policies from receiving irrelevant messages related to those types of configuration policies. The message is then transmitted by the policy server to the publish-subscribe messaging system (operation 806) and subsequently received by the subset of nodes through their subscriptions to the topic, as described above.

Configuration policies may continue to be transmitted (operation 808) by the policy server to the publish-subscribe messaging system for receipt by different subsets of nodes. For example, the policy server may publish messages containing serialized versions of the configuration policies to the publish-subscribe messaging system for receipt by nodes in the network while the publish-subscribe messaging system is used to propagate network configuration policies to the nodes.

When a configuration policy is obtained or received by the policy server (operation 802), the policy server generates a message containing the configuration policy for receipt by a given subset of nodes (operation 804) by assigning the message to a topic associated with an attribute and/or type of configuration policy that defines and/or otherwise identifies the subset of nodes. The policy server may then transmit the message to the publish-subscribe messaging system (operation 806) for subsequent receipt by the subset of nodes and application of the configuration policy at the nodes. Propagation of configuration policies by the policy server to the nodes using the publish-subscribe messaging system may continue (operation 808) until the publish-subscribe messaging system is no longer used to apply configuration policies in the network.

Figure 9:
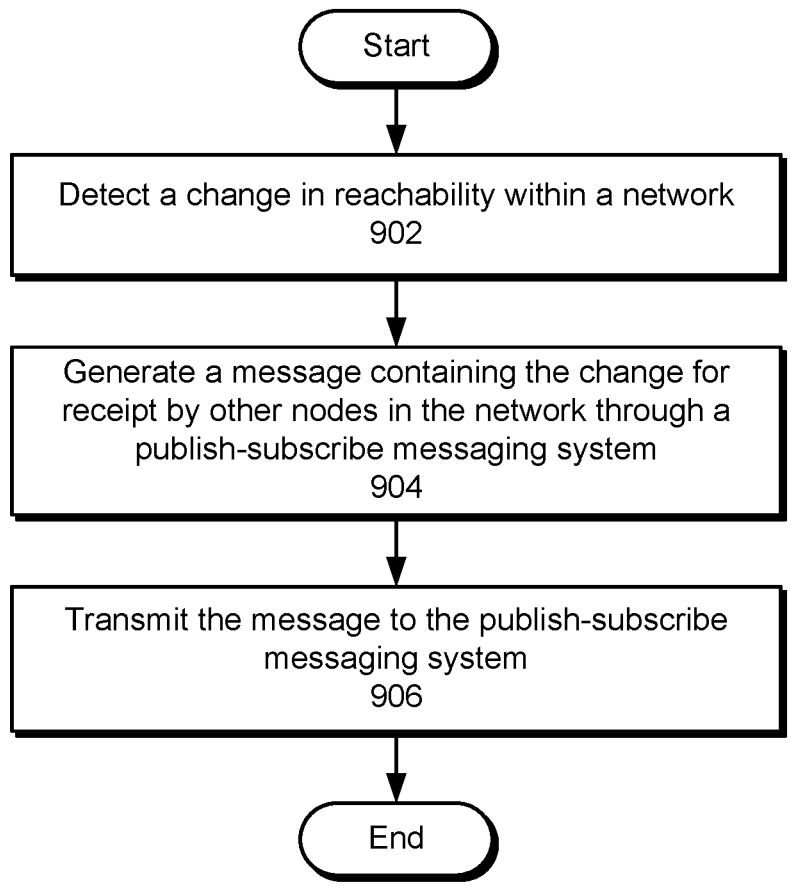
FIG. 9 shows a flowchart illustrating a process of communicating reachability information from a node in a network in accordance with the disclosed embodiments.

FIG. 9 shows a flowchart illustrating a process of communicating reachability information from a node in a network in accordance with the disclosed embodiments. In one or more embodiments, one or more of the steps may be omitted, repeated, and/or performed in a different order. Accordingly, the specific arrangement of steps shown in FIG. 9 should not be construed as limiting the scope of the technique.

Initially, a change in reachability within a network is detected (operation 902) by the node. For example, the change in reachability may be associated with a node, destination, route, link state, filter, segment routing instruction, and/or QoS policy in the network. The change in reachability may be detected by the node using "hello" packets and/or other neighbor discovery techniques.

Next, a message containing the change is generated for receipt by other nodes in the network through a publish-subscribe messaging system (operation 904). For example, the message may be assigned to a topic associated with routing in the network and/or a topic to which all nodes in the network are subscribed. The message is then published to the publish-subscribe messaging system (operation 906), received by the other nodes through the publish-subscribe messaging system, and used to update routing databases at the other nodes, as described in further detail below with respect to FIG. 10.

Figure 10:
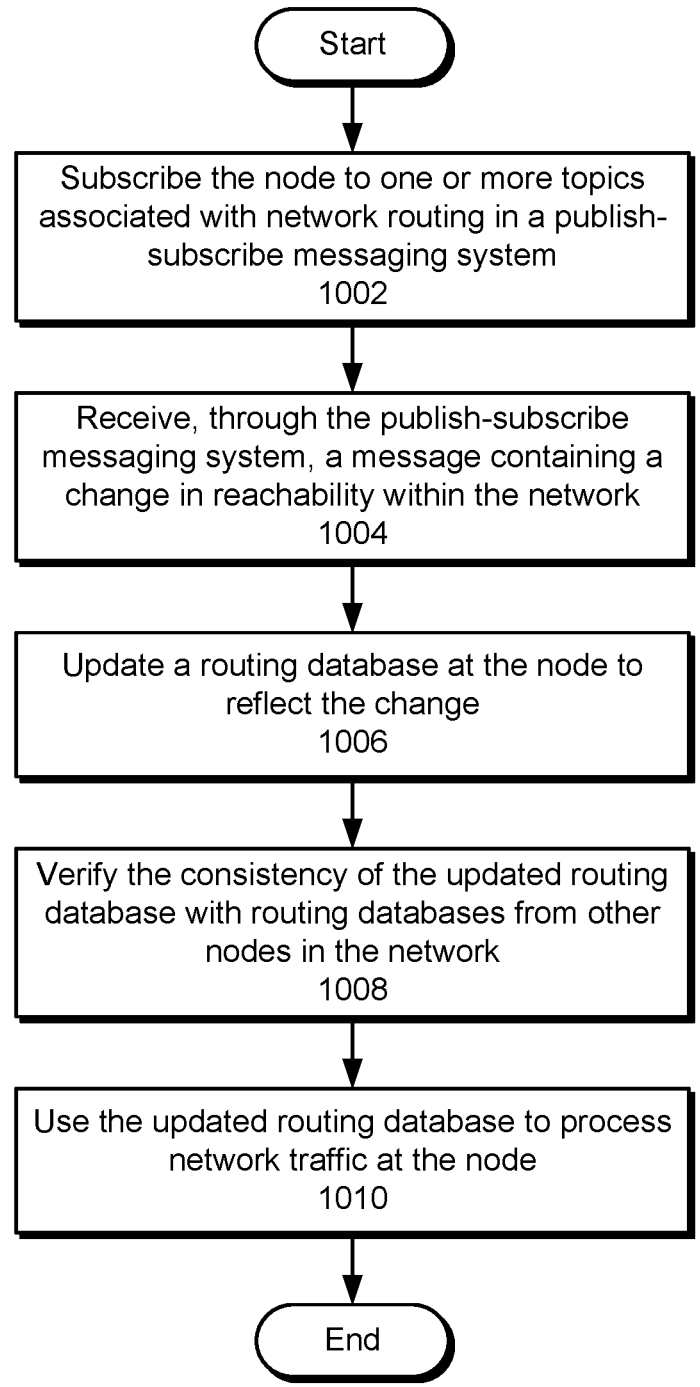
FIG. 10 shows a flow chart illustrating a process of processing reachability information received at a node in a network in accordance with the disclosed embodiments.

FIG. 10 shows a flow chart illustrating a process of processing reachability information received at a node in a network in accordance with the disclosed embodiments. In one or more embodiments, one or more of the steps may be omitted, repeated, and/or performed in a different order. Accordingly, the specific arrangement of steps shown in FIG. 10 should not be construed as limiting the scope of the technique.

First, the node is subscribed to one or more topics associated with network routing in a publish-subscribe messaging system (operation 1002). By subscribing to the topic(s), the node receives, through the publish-subscribe messaging system, a message containing a change in reachability within the network (operation 1004). The message may be generated by another node in the network upon detecting the change in reachability, as discussed above.

Next, a routing database at the node is updated to reflect the change (operation 1006). For example, one or more key-value pairs in a routing table, forwarding table, and/or link state database may be added, removed, or modified to reflect a change in route, reachable destination, link state, filter, segment routing instruction, and/or QoS policy specified in the message.

The consistency of the updated routing database with routing databases from other nodes in the network is then verified (operation 1008). For example, the node may exchange hashes, checksums, and/or another value representing the change in the routing database with other nodes in the network. If the value matches across routing database instances, the consistency of the updated routing database is verified. If a mismatch is found, one or more instances of the routing database may be identified as having inconsistent data. In turn, nodes associated with the instance(s) may re-request the message and/or other messages containing changes in reachability from the publish-subscribe messaging system and re-apply the changes to the routing database instance(s).

After the consistency of the updated routing database is verified, the updated routing database is used to process network traffic at the node (operation 1010). For example, the updated routing database may be used to select routes, identify reachable destinations, filter packets, perform segment routing, and/or apply a QoS policy during processing of network traffic by the node.

Figure 11:
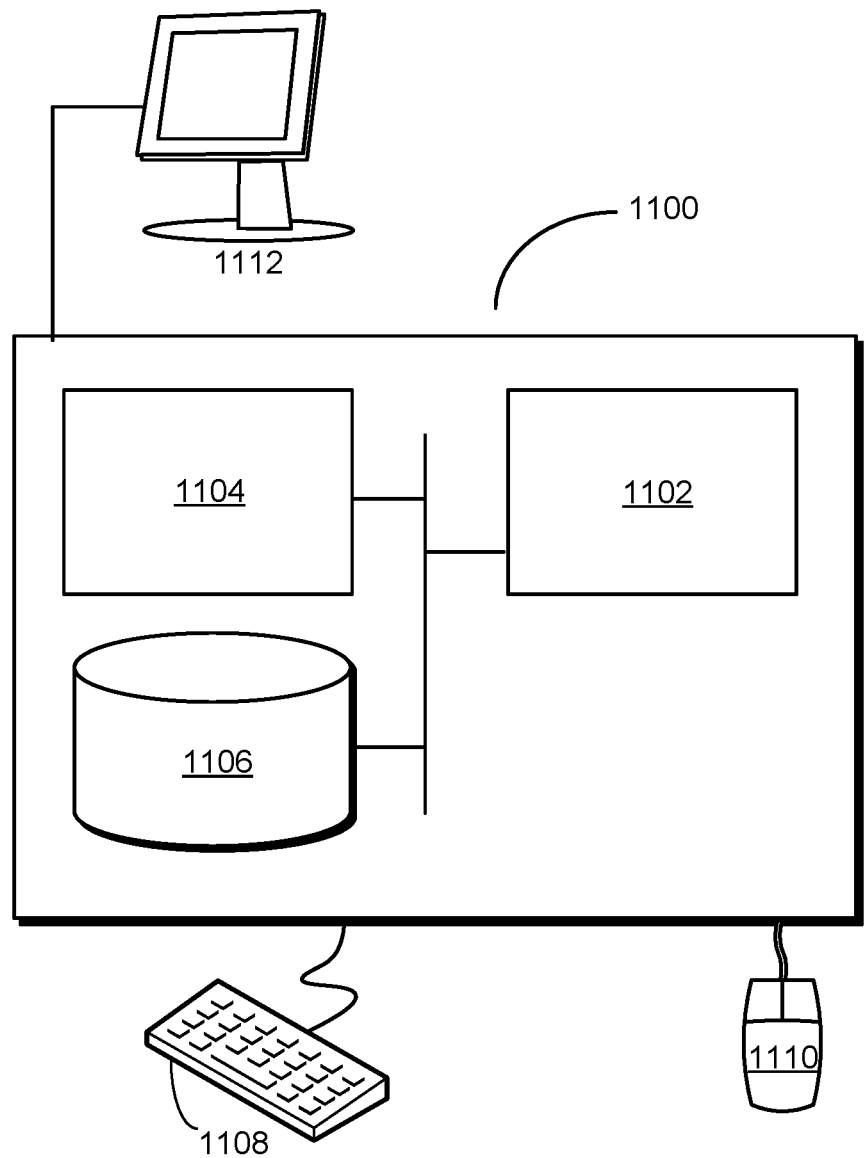
FIG. 11 shows a computer system in accordance with the disclosed embodiments.

FIG. 11 shows a computer system 1100 in accordance with the disclosed embodiments. Computer system 1100 includes a processor 1102, memory 1104, storage 1106, and/or other components found in electronic computing devices. Processor 1102 may support parallel processing and/or multi-threaded operation with other processors in computer system 1100. Computer system 1100 may also include input/output (I/O) devices such as a keyboard 1108, a mouse 1110, and a display 1112.

Computer system 1100 may include functionality to execute various components of the disclosed embodiments. In particular, computer system 1100 may include an operating system (not shown) that coordinates the use of hardware and software resources on computer system 1100, as well as one or more applications that perform specialized tasks for the user. To perform tasks for the user, applications may obtain the use of hardware resources on computer system 1100 from the operating system, as well as interact with the user through a hardware and/or software framework provided by the operating system.

In one or more embodiments, computer system 1100 provides a system for using a publish-subscribe messaging system to perform network telemetry, configuration, and/or routing in a network. To perform network telemetry, the system may include a monitoring server that obtains, through the publish-subscribe messaging system, a stream of messages from a set of nodes connected by a set of links in the network. Next, the monitoring server may analyze network telemetry data associated with the nodes from the stream of messages. The monitoring server may then output a telemetry result for the network based on the analyzed network telemetry data.

The system may also, or instead, include one or more nodes in the network. Each node may capture the network telemetry data during processing of network traffic at the node. Next, the node may transmit a stream of messages containing the captured network telemetry data to the publish-subscribe messaging system for processing by the monitoring server.

To perform centralized configuration of nodes, the system may include a policy server that obtains a first configuration policy for a first subset of nodes in a network and a second configuration policy for a second subset of nodes in the network. Next, the policy server may generate a first message containing the first configuration policy for receipt by the first subset of nodes through a publish-subscribe messaging system and generate a second message containing the second configuration policy for receipt by the second subset of nodes through the publish-subscribe messaging system. The policy server may then transmit the first and second messages to the publish-subscribe messaging system.

In turn, the node may receive, through subscriptions to topics in the publish-subscribe messaging system, one or more messages containing a first representation of a configuration policy from the policy server. Next, the node may use a data model to convert the first representation into a second representation of the configuration policy. The node may then use the second representation to apply the configuration policy during processing of network traffic.

To perform network routing, the node may detect a change in reachability within the network. Next, the node may generate a message containing the change for receipt by other nodes through the publish-subscribe messaging system. The node may then transmit the message to the publish-subscribe messaging system. The node may additionally receive another message containing another change in reachability within the network and update a routing database for processing network traffic within the network to reflect the other change.

In addition, one or more components of computer system 1100 may be remotely located and connected to the other components over a network. Portions of the present embodiments (e.g., nodes, monitoring server, policy server, publish-subscribe messaging system, etc.) may also be located on different nodes of a distributed system that implements the embodiments. For example, the present embodiments may be implemented using a cloud computing system that uses a publish-subscribe messaging system to perform network telemetry, configuration, and routing for a set of nodes in a remote network.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
   subscribing a node in a network to one or more topics associated with a configuration policy in a publish-subscribe messaging system, wherein said subscribing comprises selecting the one or more topics in the publish-subscribe messaging system based on a state of the node;
   receiving, by the node in the network through the publish-subscribe messaging system, one or more messages comprising a first representation of the configuration policy from a policy server;
   using a data model to convert, by the node, the first representation into a second representation of the configuration policy; and
   using the second representation to apply the configuration policy during processing of network traffic at the node.

2. The method of claim 1, wherein the state of the node is associated with at least one of:
   a position of the node in a topology of the network; and
   network telemetry data captured by the node.

3. The method of claim 1, wherein the one or more topics are associated with a type of the configuration policy.

4. The method of claim 3, wherein the type of the configuration policy is at least one of:

an access control list;
a routing policy;
a hardware configuration;
a prefix list;
a network telemetry configuration; and
a message to be transmitted over the network.

5. The method of claim 1, wherein the first representation is included in the one or more messages using a serialization format.

6. The method of claim 1, wherein the second representation comprises a format that can be used by a processing layer associated with the configuration policy in the node.

7. The method of claim 1, wherein the configuration policy comprises:
a policy name; and
an instruction.

8. The method of claim 7, wherein the instruction comprises at least one of:
a rule;
a condition;
a parameter; and
a value.

9. A method, comprising:
obtaining, at a policy server:
a first configuration policy for a first subset of nodes in a network; and
a second configuration policy for a second subset of nodes in the network;
generating, by the policy server:
a first message comprising the first configuration policy for receipt by the first subset of nodes through a publish-subscribe messaging system; and
a second message comprising the second configuration policy for receipt by the second subset of nodes through the publish-subscribe messaging system; and
transmitting, by the policy server, the first message and the second message to the publish-subscribe messaging system.

10. The method of claim 9, wherein generating the first message for receipt by the first subset of nodes through the publish-subscribe messaging system comprises:
assigning the first message to a topic associated with the first subset of nodes in the publish-subscribe messaging system.

11. The method of claim 10, wherein the topic represents at least one of:
a state of a node in the network; and
a type of the configuration policy.

12. The method of claim 9, wherein generating the first message comprising the first configuration policy for receipt by the first subset of nodes through the publish-subscribe messaging system comprises:
using a serialization format to include a representation of the first configuration policy in the first message.

13. The method of claim 9, wherein the configuration policy comprises at least one of:
an access control list;
a routing policy;
a hardware configuration;
a prefix list;
a network telemetry configuration; and
a message to be transmitted over the network.

14. A system, comprising:
a policy server comprising a non-transitory computer-readable medium comprising instructions that, when executed, cause the system to:
obtain a first configuration policy for a first subset of nodes in a network and a second configuration policy for a second subset of nodes in the network;
generate a first message comprising the first configuration policy for receipt by the first subset of nodes through a publish-subscribe messaging system;
generate a second message comprising the second configuration policy for receipt by the second subset of nodes through the publish-subscribe messaging system; and
transmit the first and second messages to the publish-subscribe messaging system; and
the first and second subsets of nodes, wherein each node in the first and second subsets comprises a non-transitory computer-readable medium comprising instructions that, when executed, cause the system to:
receive, through the publish-subscribe messaging system, one or more messages comprising a first representation of a configuration policy from the policy server, wherein the configuration policy is at least one of the first and second configuration policies;
use a data model to convert the first representation into a second representation of the configuration policy; and
using the second representation to apply the configuration policy during processing of network traffic.

15. The system of claim 14, wherein:
the first message is assigned to a first topic associated with the first subset of nodes in the publish-subscribe messaging system, and
the second message is assigned to a second topic associated with the second subset of nodes in the publish-subscribe messaging system.

16. The system of claim 15, wherein the first and second topics represent at least one of:
a state of the node in the network; and
a type of the configuration policy.

17. The system of claim 14, wherein:
the first representation is included in the one or more messages using a serialization format; and
the second representation comprises a format that can be used by a processing layer associated with the configuration policy in the node.

* * * * *